United States Patent [19]
Matsuura et al.

[11] Patent Number: 5,363,117
[45] Date of Patent: Nov. 8, 1994

[54] LASER-ADDRESSED LIQUID CRYSTAL DISPLAY

[75] Inventors: Kiyoshige Matsuura; Naoyuki Sumi; Kouichi Fujita, all of Kanagawa, Japan

[73] Assignee: Sony Corporation, Tokyo, Japan

[21] Appl. No.: 938,610

[22] Filed: Sep. 1, 1992

[30] Foreign Application Priority Data

Sep. 4, 1991 [JP] Japan .................. 3-224385
Sep. 6, 1991 [JP] Japan .................. 3-227315
Sep. 9, 1991 [JP] Japan .................. 3-229181

[51] Int. Cl.⁵ .................. G09G 3/36; G02F 1/13
[52] U.S. Cl. .................. 345/87; 359/45
[58] Field of Search .................. 345/12, 13, 87, 214, 345/215; 359/43, 45

[56] References Cited

U.S. PATENT DOCUMENTS

| | | | |
|---|---|---|---|
| 3,809,948 | 5/1974 | Chubb et al. | 345/12 |
| 4,810,064 | 3/1989 | Azusawa et al. | 345/87 |
| 4,952,034 | 8/1990 | Azusawa et al. | 345/87 |
| 5,014,326 | 5/1991 | Turner et al. | 359/45 |

Primary Examiner—Jeffery Brier
Attorney, Agent, or Firm—Hill, Steadman & Simpson

[57] ABSTRACT

A liquid crystal display apparatus comprises a laser beam source for emitting a laser beam, a liquid crystal cell for providing an image by means of the effect of the laser beam heating and which contains a liquid crystal layer positioned between a pair of substrates, a scanning device for scanning the laser beam to the liquid crystal layer to thereby produce a line drawing thereon, and a modulation device for modulating a line width of the line drawing so as to keep a uniform line width.

4 Claims, 17 Drawing Sheets

F I G. 13
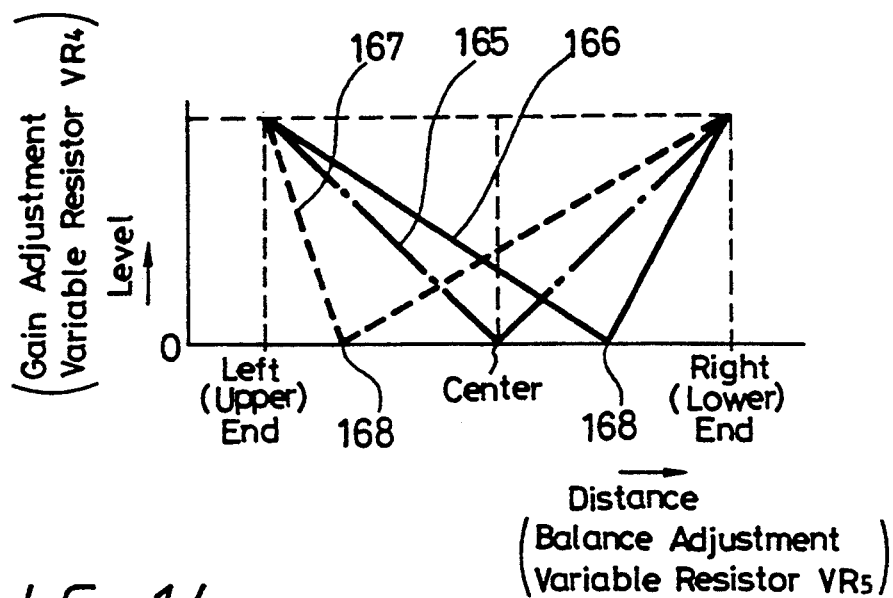
F I G. 14
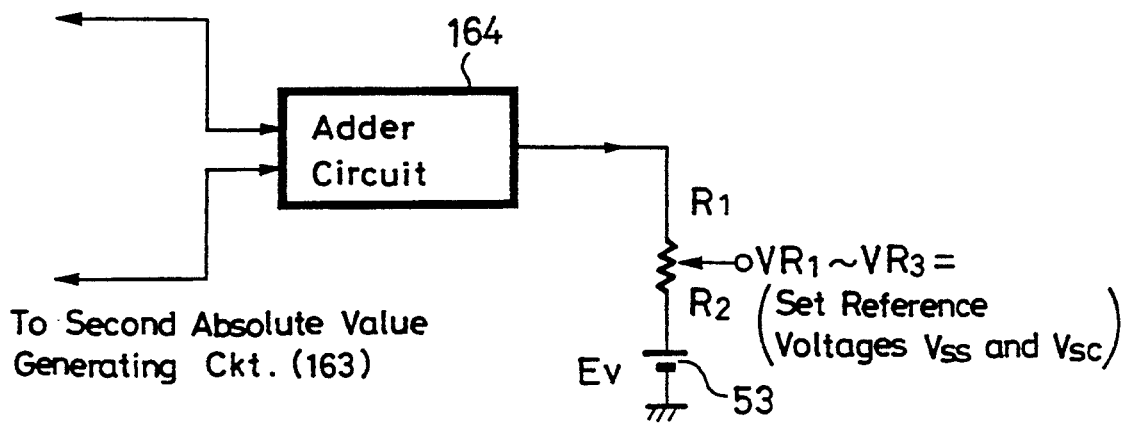

FIG. 16
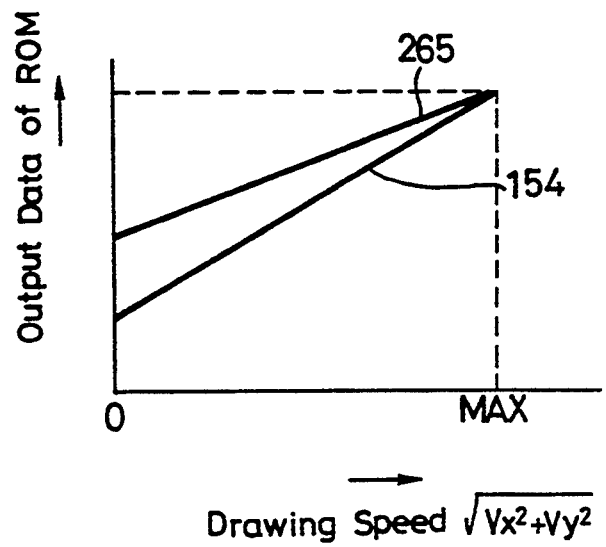
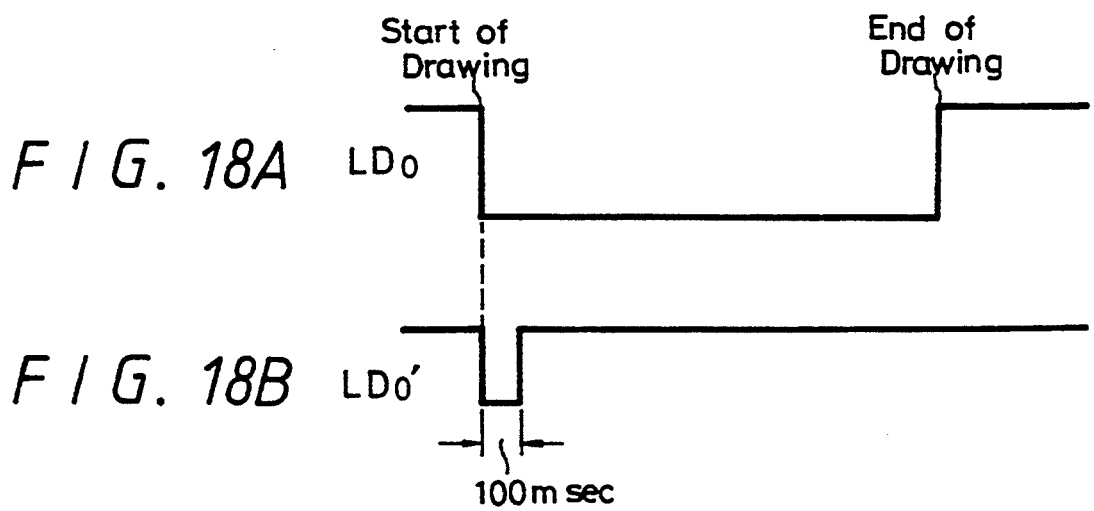

LASER-ADDRESSED LIQUID CRYSTAL DISPLAY

BACKGROUND OF THE INVENTION

1. Field of the Invention

The present invention relates to liquid crystal display devices and, more particularly, to a liquid crystal display apparatus suitable for projecting a graphic pattern or the like, written on a liquid crystal cell, onto a screen by using a liquid crystal light emitter actuated by the heat from a laser beam.

2. A Description of the Prior Art

As conventional liquid crystal display apparatus based on a liquid crystal light emitter actuated by the heat from a laser beam, there is known a projection type display or the like in which a laser beam is irradiated on a liquid crystal cell formed of a liquid crystal of smectic phase and an image written in the liquid crystal cell is projected onto a screen by utilizing a thermoelectric optical effect.

FIG. 1 of the accompanying drawings shows a structure of an optical system of the above conventional projection type liquid crystal display apparatus based on a liquid crystal light emitter actuated by the heat from a laser beam.

As shown in FIG. 1, a laser beam emitted from a laser diode 30 disposed within a laser block 1 is traveled through galvanoscanner mirrors 3a, 3b, which deflect a laser beam on a liquid crystal cell 7 (described later on) in the Y-axis direction and X-axis direction, a relay lens 2, a first condenser lens 4, and then reflected on a dichroic mirror 5 to become a writing laser beam 6. This writing laser beam 6 is focused on a liquid crystal surface of the liquid crystal cell 7. A point at which the writing laser beam 6 radiates the liquid crystal cell 7 is held in this state.

The writing laser beam 6 irradiated on the surface of the liquid crystal cell 7 is scanned by the two Y-axis and X-axis galvanoscanner mirrors 3a, 3b to thereby draw a graphic pattern or the like on an arbitrary position on the liquid crystal surface of the liquid crystal cell 7.

The graphic pattern or the like drawn on the liquid crystal surface of the liquid crystal cell 7 is projected on to a screen 9 by means of a projection light 10 from a projection lamp 8. That is, the projection light 10 from the projection lamp 8 is converged by a condenser lens 11 and irradiated on the the liquid crystal cell 7 from its rear side through the dichroic mirror 5, whereby the graphic pattern or the like on the liquid crystal surface of the liquid crystal cell 7 is projected on to the screen 9 via a projection lens 12.

A theory in which the graphic pattern or the like is drawn on the surface of the liquid crystal cell 7 by the heat from the laser beam as described above will be described with reference to FIGS. 2A through 2D of the accompanying drawings. As illustrated, the liquid crystal cell 7 comprises two glass substrates 14 and 15. Transparent electrode layers 16, 17 made of indium oxide-tin oxide (ITO) or the like and insulating layers 18, 19 made of silicon dioxide ($SiO_2$) or the like are respectively coated on the glass substrates 14, 15. A laser mirror 20 is formed on the glass substrate 14 which is located on the opposite side of the glass substrate 15 into which the writing laser beam 6 is introduced. The laser mirror 20 is formed of a dielectric optical multilayer.

A space or vacant cell between the two glass substrates 14 and 15 is sealed by a sealing material 21 such as a thermosetting resin or the like.

A smectic liquid crystal 24 or the like is filled into the vacant cell sealed by the sealing material 21. The smectic liquid crystal 24 may be formed of a liquid crystal whose phase is changed in the order of a smectic A phase, a nematic phase and an isotropic phase.

If the liquid crystal 24 is returned in phase to the original smectic A phase after the phase transition from the smectic A phase to the isotropic phase occurred due to the heat from a laser beam, then a random orientation in the isotropic phase is retained in the smectic A phase and the light scattering state is formed, thereby retaining the memory state. If this memory state is erased, then the phase of the liquid crystal 24 is returned to the smectic A phase of the regular alignment by the application of a voltage.

The transparent electrode layers 16, 17 are formed in order to apply the voltage to the liquid crystal cell 7 when a displayed image is erased, while the insulating layers 18, 19 are formed in order to prevent the transparent electrode layers 16, 17 from being short-circuited by impurities doped into the liquid crystal 24. Further, the laser mirror 20 is coated on the glass substrate 14 in order to reflect the writing laser beam 6 introduced thereto from the laser diode 30 to thereby effectively utilize the energy of the laser beam.

A switch 22 and an AC power supply 23 are connected in series between the transparent electrode layers 16 and 17 of the above liquid crystal cell 7.

In the state shown in FIG. 2A, the switch 22 is in its off state and the liquid crystal 24 is in the smectic A phase of the regular alignment.

Then, when the writing laser beam 6 is introduced into the liquid crystal cell 7 from the glass substrate 15 side as shown in FIG. 2B, only a liquid crystal 24a irradiated with the writing laser beam 6 is changed in phase to the isotropic phase of the light scattering state and becomes a pixel 25 as shown in FIG. 2C so that a predetermined image may be drawn.

Then, when the switch 22 is turned on to apply a voltage across the transparent electrode layers 16, 17 from the AC power supply 23 as shown in FIG. 2D, the isotropic phase of the liquid crystal 24 is returned to the original smectic A phase of the regular alignment.

FIG. 3 of the accompanying drawings shows a structure of the optical system disposed within the above laser block 1 in the conventional liquid crystal display apparatus. In FIG. 3, like parts corresponding to those of FIG. 1 are marked with the same references and therefore need not be described in detail.

As shown in FIG. 3, a laser beam emitted from the laser diode 30 is introduced through a collimator lens 31 and an anamorphic prism 32 into a half-wave plate 33. A laser beam of a linear polarized P-component, for example, emitted from the laser diode 30 is collimated by the collimator lens 31. Then, the collimated laser beam from the collimator lens 31 is changed in spot shape from ellipse to circle by the anamorphic prism 32. A part of the laser beam (i.e., less than several percents) is changed by the half-wave plate 33 to a linear polarized S-component whose vibration direction is rotated 90 degrees.

The linear polarized P-component and S-component from the half-wave plate 33 are introduced into a polarizing beam splitter 34, in which they are separated into a traveling light and a reflected light. The S-component whose light amount is about 1 to 2% is reflected by the polarizing beam splitter 34 whereas other P-component is passed through the polarizing beam splitter 34.

The S-component reflected by the polarizing beam splitter 34 is converged by a collimator lens 35 that serves to monitor a laser beam and introduced into a photodiode 36 that is used to monitor the laser beam from the laser diode 30.

The laser beam passed through the polarizing beam splitter 34 is introduced into a quarter-wave plate 37. The linear polarized P-component is changed by the quarter-wave plate 37 into a circular polarized P-component and scanned by the galvanoscanner mirrors 3a, 3b shown in FIG. 1 so that it is focused on the liquid crystal 24 of the liquid crystal cell 7 as the writing laser beam 6, thereby writing a predetermined graphic pattern on the surface of the liquid crystal 24.

A position detecting reflected-back beam 39 that has been reflected by a reflecting layer (e.g., aluminum layer) 40 or the like disposed on predetermined positions (e.g., top and end of and right and left of X-axis and Y-axis directions) of the panel surface of the liquid crystal cell 7 is returned again into the laser block 1 by means of the galvanoscanner mirrors 3a, 33b. Of course, although the writing laser beam 6 is irradiated on the liquid crystal 24 of the liquid crystal cell 7 as the heat energy to change the liquid crystal cell 24 in phase from the smectic A phase to the isotropic phase thereby drawing a graphic pattern or the like, other extra energy is returned into the laser block 1 as the reflected-back beam 39.

The reflected-back beam 39 returned into the laser block 1 is changed again into the linear polarized S-component by the quarter-wave plate 37. The S-component is reflected by the polarizing beam splitter 34 and introduced into a collimator lens 41 that is used to detect a drawing position and a photodiode 42.

Further, when the surface of the liquid crystal cell 7 is scanned by the galvanoscanner mirrors 3a, 3b in the liquid crystal display apparatus based on a liquid crystal light emitter actuated by the heat from the laser beam, an automatic power control (APC) is effected such that an output power density of the laser diode 30 is made constant in response to the drawing speed.

FIG. 4 of the accompanying drawings shows in block form a conventional circuit for controlling a laser power density. In FIG. 4, like parts corresponding to those of FIGS. 1 and 3 are marked with the same references and therefore need not be described in detail.

As shown in FIG. 4, the laser block 1 that was earlier described with reference to in FIG. 3 includes therein the laser diode 30 serving as the laser beam source and the photodiode 36 that monitors the output of the laser diode 30. The output from the laser diode 30 which is detected by the photodiode 36 is fed through a current-to-voltage converter circuit 44 back to one input terminal of a comparator circuit 45 formed of an amplifier. Further, an output from the comparator circuit 45 is converted into a current by a voltage-to-current converter circuit 46 which is controlled by a pulse width modulation (PWM) wave from a PWM controller circuit 47 and then supplied to the laser diode 30 so that the output of the laser diode 30 is made constant.

The PWM controller circuit 47 and the comparator circuit 45 are both controlled by a computer (hereinafter referred to as a CPU (central processing unit)) 48 forming a system controller.

A reference voltage from a reference voltage setting circuit 52 is supplied to the other input terminal of the comparator circuit 45.

The reference voltage setting circuit 52 includes a first variable resistor $VR_1$ that sets a reference voltage used to draw a bold line, a second variable resistor $VR_2$ that sets a reference voltage used to draw a middle line and a third variable resistor $VR_3$ that sets a reference voltage used to draw a fine line. The first to third variable resistors $VR_1$ to $VR_3$ are connected in parallel to one another, and one common junction thereof is grounded, whereas the other common junction thereof is connected to the cathode of a power supply 53 whose anode is grounded. Thus, the output laser power is set such that it is maximized at the ground potential.

One ends of the sliding contacts of the first to third variable resistors $VR_1$ to $VR_3$ are connected to three-state circuits 55a, 55b and 55c each constructing a line-width reference voltage selector. Outputs of the three-state circuits 55a, 55b and 55c are commonly connected to the other input terminal of the amplifier that constructs the comparator circuit 45.

Laser drive signals $LD_0$, $LD_1$ are output from the CPU 48 and fed to a decoder 54. The decoder 54 turns off the laser drive signal when the laser drive signal $LD_0$ is at "H" (high) level and the laser drive signal $LD_1$ is at "H" (high) level; the decoder 54 supplies a line type switching signal representative of a fine line drawing to the gate of the three-state circuit 55c when the laser drive signal $LD_0$ is at "L" (low) level and the laser drive signal $LD_1$ is at "H" (high) level; the decoder 54 supplies a line type switching signal representative of a middle line drawing to the gate of the three-state circuit 55b when the laser drive signal $LD_0$ is at "H" (high) level and the laser drive signal $LD_1$ is at "L" (low) level; and the decoder 54 supplies a line type switching signal representative of a bold line drawing to the gate of the three-state circuit 55a when the laser drive signal $LD_0$ is at "L" (low) level and the laser drive signal $LD_1$ is at "L" (low) level. Accordingly, reference voltages set by the resistance values of the variable resistors $VR_1$ through $VR_3$ in response to the types of the drawing lines are supplied to the comparator circuit 45 so that the output laser power of the laser diode 30 is made constant.

Potentiometers (X-axis and Y-axis scanners though not shown) or the like of an X-axis scanner driver circuit 50 and a Y-axis scanner driver circuit 51, controlled by the CPU 48 so as to drive the galvanoscanner mirrors 3a, 3b, are varied to output X- and Y-axis line drawing speed voltages $V_x$ and $V_y$. Then, in response to the control signals from the CPU 48, the X-axis scanner driver circuit 50 and the Y-axis scanner driver circuit 51 drive galvano-motors $3_{a1}$ and $3_{b1}$ of the galvanoscanner mirrors 3a, 3b.

In the liquid crystal display apparatus based on the liquid crystal cell 7 actuated by the heat energy from the laser beam, as X-position signal $V_x$ and the Y-position signal $V_y$ supplied to the galvano-motors $3_{a1}$, $3_{b1}$ of the galvanoscanner mirrors 3a, 3b from the X-axis and Y-axis scanner driver circuits 50, 51, there are supplied sawtooth-waveform signals 56, 57 relative to the X axis and Y axis within the display area of the liquid crystal cell 7 as shown in FIG. 5.

As described above, in the conventional liquid crystal display apparatus based on the liquid crystal cell 7 actuated by the heat energy from the laser beam, the laser peak power is made constant in response to the line types regardless of the position at which a line is drawn. More specifically, the reference voltage that is determined by the set line width to be drawn is set by the reference voltage setting circuit 52 and supplied to the amplifier 45 forming the comparator circuit as the reference voltage, whereby the constant laser power output is generated from the laser diode 30.

However, when the laser peak power of the laser diode 30 is made constant irrespective of the line drawing position as described above, the following problems occur. That is, when the writing laser beam 6 is not properly focused on the interlayer of the liquid crystal 24 of the liquid crystal cell 7 due to the influence of the optical lens and the optical path difference upon drawing or a temperature at which a line is drawn on the liquid crystal 24 of the liquid crystal cell 7 by the heat energy from the writing laser beam 6 is not uniformly distributed, if the voltage of the variable resistor $VR_1$ is adjusted such that a line width 58 of a graphic pattern projected onto the display area of the liquid crystal cell 7 or on the screen 9 becomes a predetermined line width, e.g., bold line width at the central portion of the screen 9, then the line width 58 is reduced in width or cannot be drawn at all on the peripheral portion of the screen 9 as shown in FIG. 5.

FIG. 6 of the accompanying drawings shows another example of the conventional laser power density controller circuit. In FIG. 6, like parts corresponding to those of FIGS. 1, 3 and 4 are marked with the same references and therefore need not be described in detail.

As shown in FIG. 6, the laser diode drive data $LD_1$, LDO are supplied from the CPU 48 to high-order addresses $A_{1\,5}$, $A_{1\,4}$ of the ROM (read-only memory) in the vector generator circuit 49 and also supplied to the power controller circuit (comparator circuit) 45. The ROM 49 derives laser-off data, fine line drawing data, middle line drawing data and bold line drawing data. In the laser diode drive data map stored in the ROM 49, an address of bold line, for example, is set to $FF_H$, an address of middle line is set to $BF_H$ and an address of fine line is set to $7F_H$, respectively, whereby the maximum output powers of the laser diode 30 are made constant in response to the types of lines to be drawn.

Further, the X-axis scanning driver circuit 50 and the Y-axis scanning driver circuit 51 which drive the galvanoscanner mirrors 3a, 3b are operated to generate X-axis and Y-axis line drawing speed voltages $V_x$ and $V_y$ by varying the potentiometers thereof or the like. These voltages $V_x$, $V_y$ are supplied to and converted into digital data by analog-to-digital (A/D) converter circuits 62, 63, respectively. Then, these digital data are supplied to lower-order bit addresses $A_0$ to $A_6$ and $A_7$ to $A_{1\,3}$ of the ROM 49. Then, the output data X, Y corresponding to the drawing speeds and which are stored in the ROM 49 are supplied to the galvano-motors $3_{a\,1}$, $3_b$ 1 of the galvanoscanner mirrors 3a, 3b or the like, thereby constructing the laser driver unit 60.

In the projection type liquid crystal display apparatus based on the liquid crystal cell 7 that is actuated by the heat energy from the laser beam, as data corresponding to the drawing speed when the bold line drawing data, for example, is selected and which is derived from the ROM 49, there is stored data of value which is shown by a straight line 154 having a predetermined inclination in FIG. 7. In this case, the above drawing speed is a speed which results from synthesizing an X-axis indication speed $V_x$ and a Y-axis indication speed $V_y$ in a vector fashion.

Furthermore, the laser power of the laser diode 30 is controlled by varying pulse widths $\tau_1$ and $\tau_2$ of the pulse-width modulated (PWM) waveform in response to the drawing speed as shown in FIGS. 8A and 8B. That is, in the control of the laser power of the laser diode 30, the laser peak power is set and fixed in response to the types of lines to be drawn and the pulse width modulation is carried out in response to the drawing speed.

Bold line, middle line and fine line of predetermined widths are drawn on the liquid crystal surface of the liquid crystal cell 7 in response to the drawing speeds under the condition such that the laser power density of the laser diode 30 is made constant. However, if these lines are drawn on the liquid crystal surface of the liquid crystal cell 7 under the same laser power density in the beginning of and during the drawing, there is then the defect that the line width when the drawing is just started is reduced.

A cause that the line width is unavoidably reduced in the beginning of the drawing of line will be described with reference to FIG. 9.

As shown in FIG. 9 of the accompanying drawings, when bold lines 159a, 159b having a width W and lengths $L_1$, $L_2$, for example, are drawn on the liquid crystal cell 7 by the heat energy from the laser beam, the liquid crystal 24 is not heated sufficiently in the beginning of the drawing where a laser beam spot 156 of the laser beam from the laser diode 30 is irradiated on a position shown by a broken line portion 155 so that the liquid crystal 24 is not changed in phase to the isotropic phase. Under this condition, the beam spot 156 is moved at a predetermined drawing speed in the direction shown by an open arrow A in FIG. 9 so that a condition in which a temperature is raised becomes different from that in the beginning of the drawing because a midway portion 158 in which a beam spot 156a that has moved to the next position is moved is pre-heated.

That is, only a hatched portion 157 in the bold line 159b is written. Consequently, the line width in the beginning of the drawing is reduced so that the bold lines 159a, 159b having the predetermined lengths $L_1$, $L_2$ cannot be drawn as they are instructed.

Furthermore, as shown in FIG. 3, although the writing laser beam 6 within the laser block 1 contributes to the drawing as the energy for changing the liquid crystal 24 in phase from the smectic A phase into the isotropic phase when it irradiates the liquid crystal 24 disposed within the liquid crystal cell 7, the extra energy is introduced into the photodiode 42 as a reflected-back light 39. The reflected-back beam 39 that has been reflected on the surface of the photodiode 42 is changed into a scattering beam 43. While the scattering beam 43 is partly reflected on the polarizing beam splitter 34, a part of the scattering beam 43 is passed through the polarizing beam splitter 34 and then introduced into the monitor photodiode 36.

In the above-mentioned liquid crystal display apparatus based on a liquid crystal light emitter actuated by the heat from the laser beam, the output laser power of the laser beam from the laser diode 30 relative to the drawing speed of the writing laser beam when the drawing is effected is controlled by the PWM system so that, if the output level of the laser diode 30 is varied, then the line width of the line to be drawn or the like is changed significantly.

For this reason, the output level of the laser diode 30 must be monitored accurately. Therefore, in the optical system shown in FIG. 3, the output level of the laser diode 30 is monitored by the monitor photodiode 36 and the detected output of the photodiode 36 is fed back to the laser diode 30 in an APC fashion, thereby stabilizing the output power of the laser diode 30.

However, if the scattering beam 43 whose intensity is fluctuated is introduced into the monitor photodiode 36 from the position detection photodiode 42, then the output power of the laser diode 30 is fluctuated.

OBJECTS AND SUMMARY OF THE INVENTION

Accordingly, it is an object of the present invention to provide a liquid crystal display apparatus in which the aforesaid shortcomings and disadvantages of the prior art can be eliminated.

More specifically, it is an object of the present invention to provide a liquid crystal display apparatus in which a line of a uniform line width can be drawn on the whole surface of a display area of a screen or liquid crystal cell.

Another object of the present invention is to provide a liquid crystal display apparatus in which an output of a laser diode can be stabilized.

A further object of the present invention is to provide a liquid crystal display apparatus which can be simplified in structure.

According to an aspect of the present invention, there is provided a liquid crystal display apparatus which comprises a laser beam source for emitting a laser beam, a liquid crystal cell for providing an image by means of the effect of the laser beam heating and which contains a liquid crystal layer positioned between a pair of substrates, scanning devices for scanning the laser beam to the liquid crystal layer to thereby produce a line drawing, and a modulation device for modulating a line width of the line drawing so as to keep a uniform line width.

BRIEF DESCRIPTION OF THE DRAWINGS

FIG. 13 is a diagram used to explain a method of adjusting gain and balance adjustment variable resistors of the liquid crystal display apparatus according to the first embodiment of the present invention;

FIG. 14 is a diagram used to explain a set reference voltage in the liquid crystal display apparatus according to the first embodiment of the present invention;

FIG. 16 is a characteristic diagram used to explain a relation between a drawing speed and a ROM output in the liquid crystal display apparatus according to the second embodiment of the present invention;

FIGS. 18A and 18B are respectively diagrams of waveforms used to explain operation of the liquid crystal display apparatus according to the second embodiment of the present invention;

DETAILED DESCRIPTION OF THE PREFERRED EMBODIMENTS

A liquid crystal display apparatus according to a first embodiment of the present invention will now be described with reference to FIGS. 10 to 14. In FIGS. 10 to 14, like parts corresponding to those of FIGS. 1 to 9 are marked with the same references and therefore need not be described in detail.

Figure 4:
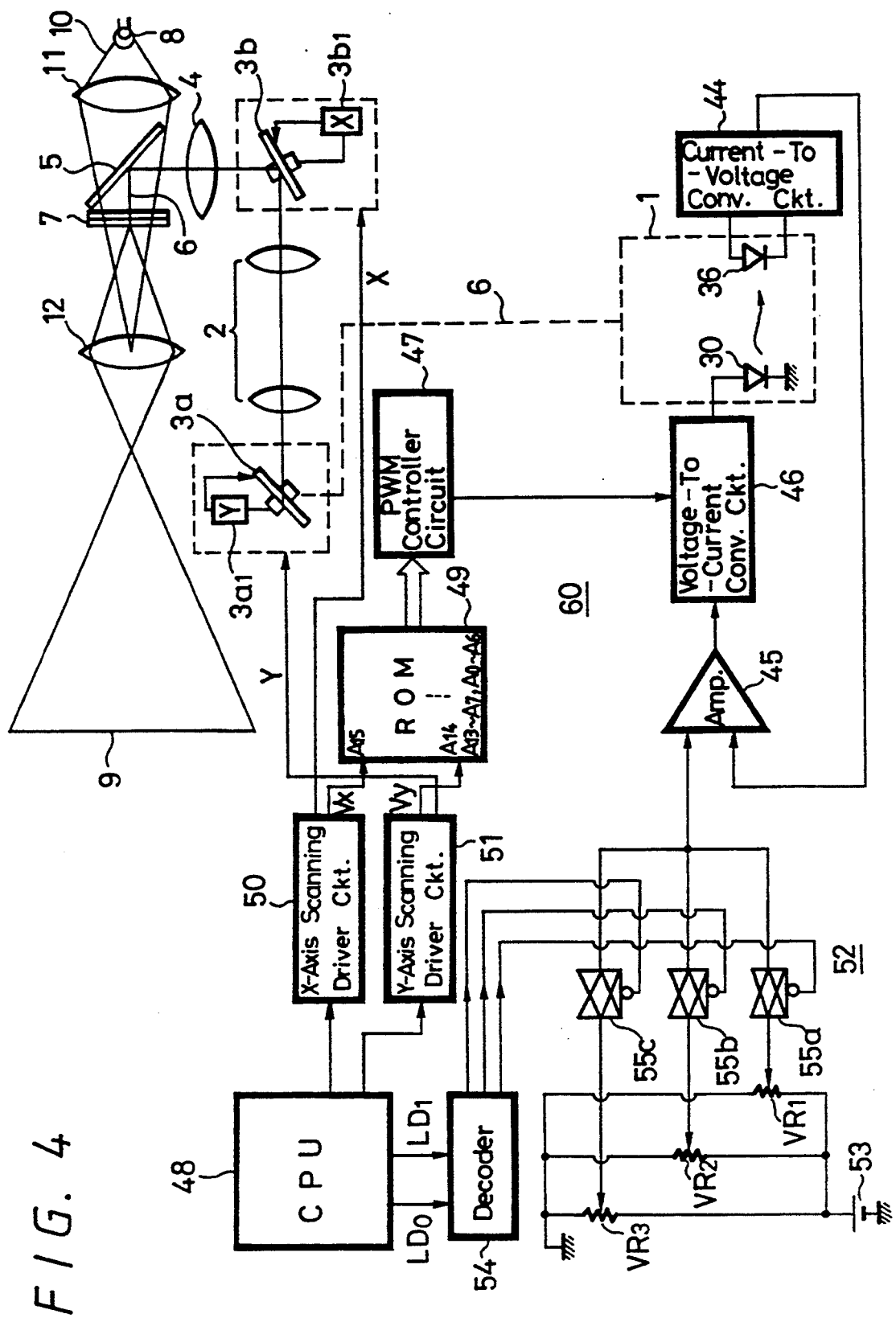
FIG. 4 is a block diagram of a laser driver unit of the conventional liquid crystal display apparatus.
Figure 5:
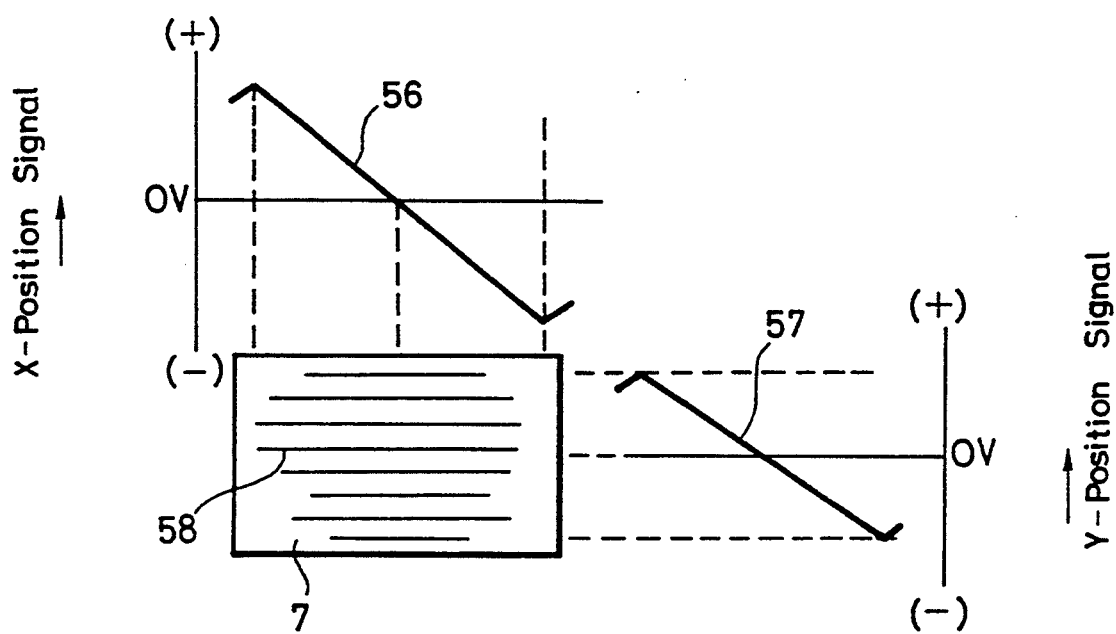
FIG. 5 is a diagram used to explain a position signal of the conventional liquid crystal display apparatus.
Figure 10:
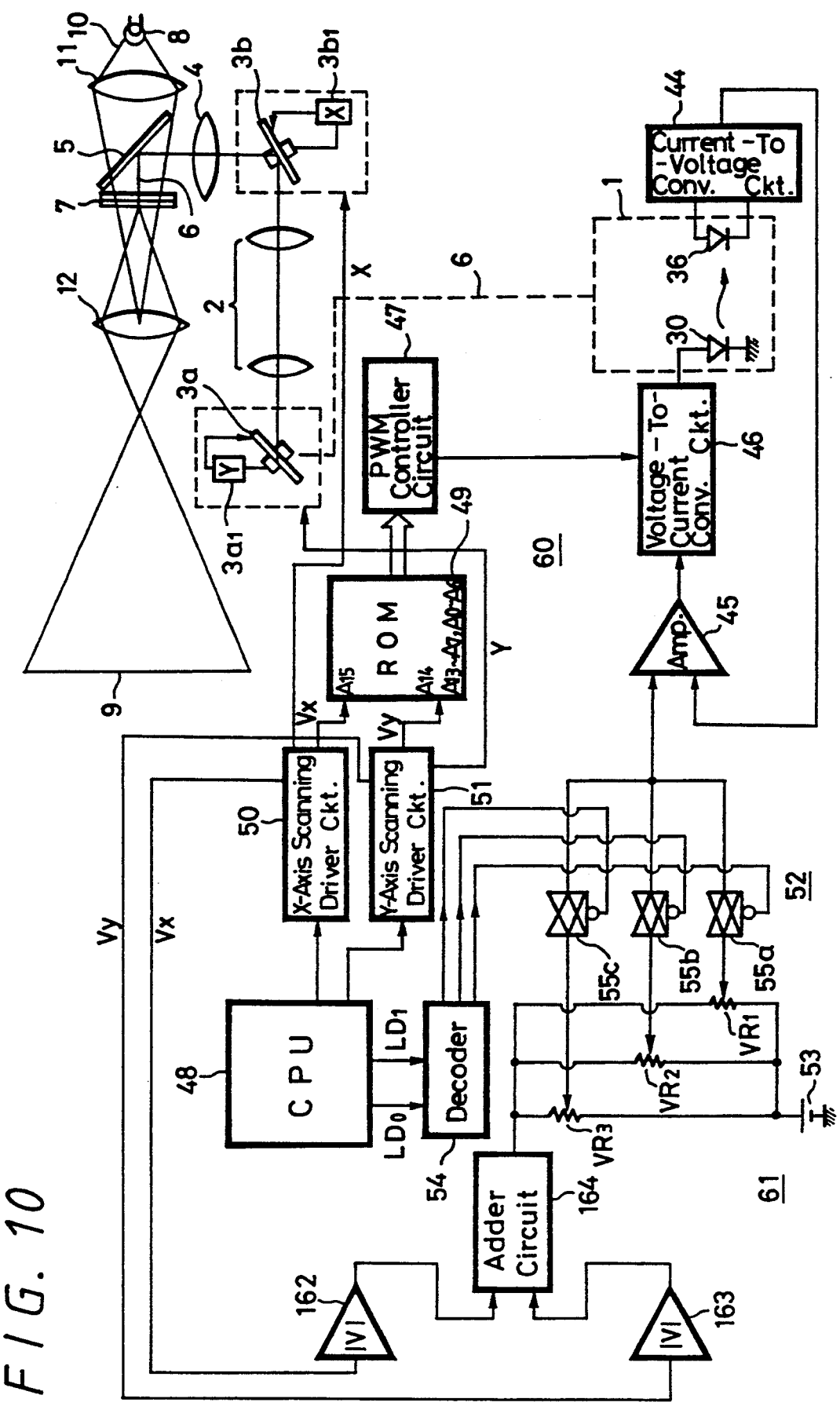
FIG. 10 is a block diagram showing a first embodiment of a laser driver unit of a liquid crystal display apparatus according to the present invention.

FIG. 10 of the accompanying drawings shows in block form the whole circuit of a laser driver unit according to the first embodiment of the present invention, wherein like parts corresponding to those of FIG. 4 are marked with the same references. According to this embodiment, the arrangement of FIG. 10 is different from that of FIG. 4 in that a position adjusting circuit 61 is provided at the preceding stage of the reference voltage setting circuit 52 that sets a reference voltage in response to the type of line to be drawn.

As shown in FIG. 10, the position adjusting circuit 61 comprises first and second absolute value generator circuits 162, 163 to which there are respectively supplied the X-position signal voltage $V_x$ and the Y-position signal voltage $V_y$ (see FIG. 5) from the X-axis and Y-axis scanning driver circuits 50, 51 and an adder circuit 164 to which the outputs of the first and second absolute value generator circuits 162, 163 are supplied. An output of the adder circuit 164 is connected to the ground potential that is provided in the reference voltage setting circuit 52 as shown in FIG. 4.

Figure 11:
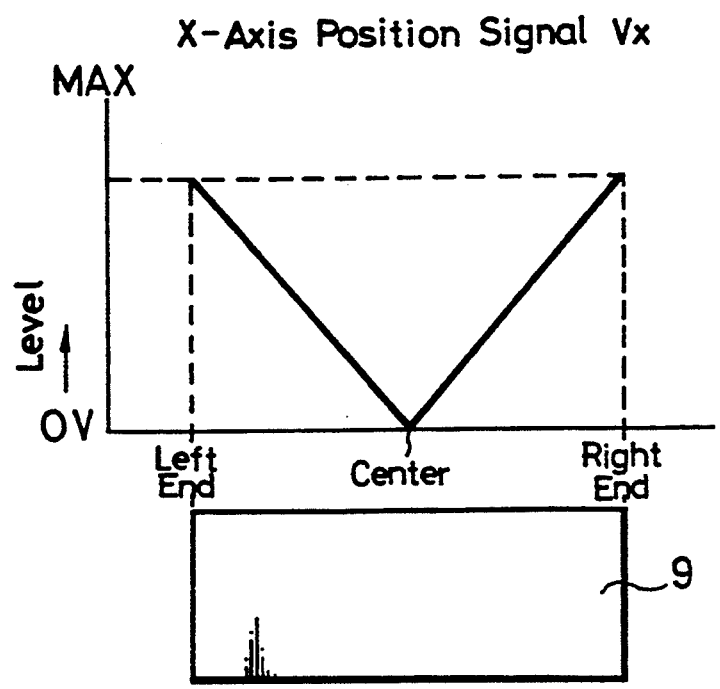
FIG. 11 is a diagram used to explain an output waveform of a first absolute value generator circuit used in the liquid crystal display apparatus according to the first embodiment of the present invention.
Figure 12:
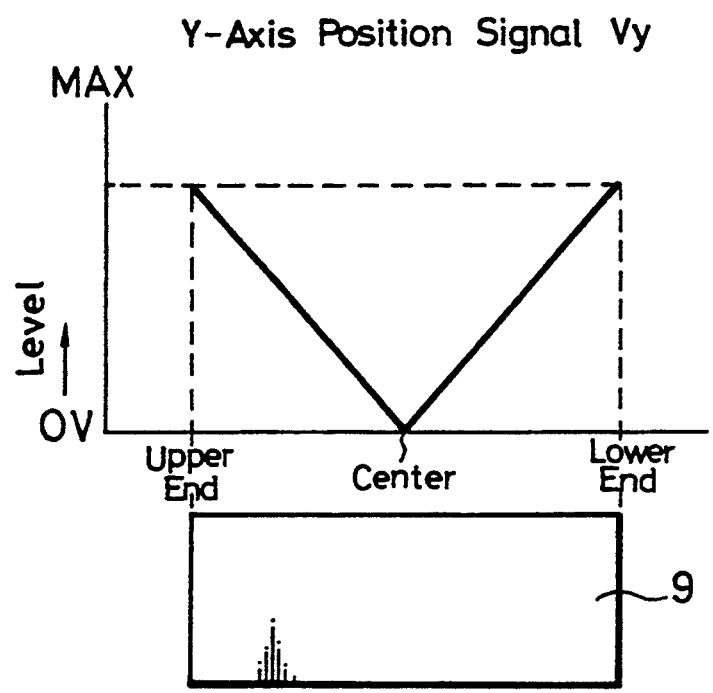
FIG. 12 is a diagram used to explain an output waveform of a second absolute value generator circuit used in the liquid crystal display apparatus according to the first embodiment of the present invention.

The first and second absolute value generator circuits 162 and 163 are arranged so as to generate output signals whose waveforms are illustrated in FIGS. 11 and 12. That is, the X-axis position signal $V_x$ supplied to the input of the first absolute value generator circuit 162 is selected so that it is held at the maximum voltage level at the left end and right end of the display area of the screen 9 or the liquid crystal cell 7.

Similarly, the Y-axis position signal $V_y$ supplied to the input of the second absolute value generator circuit 163 is selected so that it is held at the maximum voltage level at the upper end and lower end of the display area of the screen 9 or the liquid crystal cell 7.

More specifically, the first and second absolute value generator circuits 162 and 163 each include a gain adjustment variable resistor $VR_4$ that determines the gain correcting amount and a variable resistor $VR_5$ that determines a balance to be adjusted. The variable resistors $VR_4$, $VR_5$ are not shown in FIG. 10 but will be described later on with reference to FIG. 13. Accordingly, by adjusting the X-axis and Y-axis gain and balance adjustment variable resistors $VR_4$ and $VR_5$, a relation between the voltage level and the screen position can be freely adjusted such that a waveform 165 shown by one-dot chain line in FIG. 13 and whose voltage level is zero at the center position of the screen 9 is changed to a waveform 166 shown by a solid line whose zero-cross point 168 is moved toward the right end or toward the lower end of the screen 9 or to a waveform 167 whose zero-cross point 168 is moved toward the left end or toward the upper end of the screen 9 as shown by a broken-line in FIG. 13.

With reference to FIG. 14, let us calculate set reference voltages $V_{sc}$ and $V_{ss}$ when a voltage waveform of a predetermined level which results from adding both outputs of the first and second absolute value generator circuits 162 and 163 by the adder circuit 164 is supplied to the variable resisters $VR_1$ to $VR_3$ of the line types in the reference voltage setting circuit 52.

Assuming now that resistance dividing ratio of the variable resisters $VR_1$ to $VR_3$ is $R_1:R_2$ and that a voltage of the negative power supply 53 is represented as EV, then the set reference voltage $V_{s\ c}$ is expressed as $V_{s\ c} = \{R_1/R_1+R_2\}\cdot E$ at the center of the screen 9. Also, the set reference voltage $V_{s\ s}$ is expressed as $V_{s\ s} = \{R_1/R_1+R_2\}\cdot(V_x+V_y+E) = \{R_1/R_1+R_2\}\cdot(V_x+V_y) - \{R_1/R_1+R_2\}\cdot E$ on the peripheral portions of the upper, lower, right and left ends of the screen 9. In this equation, $\{R_1/R_1+R_2\}\cdot(V_x+V_y)$ represents the increased amount of the voltage at the peripheral portion of the screen 9.

If now the line type switching signal is supplied to the gate of the three-state circuit 55a as the decoded output of the decoder 54, then the reference voltage signals for fine and middle lines are not supplied to the amplifier 45 forming the comparing circuit but only the reference voltage signal for the bold line is supplied to the amplifier 45. This reference voltage corresponds to the bold line and the reference voltage corresponding to the peripheral portion of the screen 9 is compensated for as compared with that of the center portion of the screen 9. This reference voltage is compared with the detected signal from the monitor photodiode 36 of the laser diode 30 and a difference component thereof is supplied to the voltage-to-current converter circuit 46.

At the drawing speed at which the X-axis and Y-axis speed signals $V_x$ and $V_y$ are synthesized by the vector generator circuit 49 in a vector fashion, the PWM waveform of pulse width corresponding to this drawing speed is supplied to the voltage-to-current converter circuit 46 from the PWM controller circuit 47. In this voltage-to-current converter circuit 46, the reference voltage is modulated in level and compensated by the X-axis and Y-axis position signal voltages such that the reference voltage is increased on the peripheral portion of the screen 9. As a result, the level of the PWM waveform is raised in the peripheral portion of the screen 9 and lowered at the center portion thereof.

Since the liquid crystal display apparatus according to the first embodiment of the present invention is arranged and operated as described above, even if the line width is reduced on the peripheral portion of the screen 9 or nothing can be drawn on the screen 9 when the laser beam is not properly focused on the surface of the liquid crystal 24 due to lens characteristics, displacement of optical axis and so on or the temperature distribution of the liquid crystal cell heated in the constant temperature oven is not uniform, the above problems can be solved electrically by fine adjusting the variable resistors in the gain and balance adjusting circuit within the first and second absolute value generator circuits 162, 163. Hence, a line of a uniform line width can be drawn.

According to the liquid crystal display apparatus according to the first embodiment of the present invention, the line of uniform line width can be drawn on the whole surface of the screen by varying the laser power level of the laser beam source in response to the drawing position.

A second embodiment of the present invention will now be described with reference to FIG. 15 to FIGS. 19A, 19B, wherein like parts corresponding to those of the first embodiment are marked with the same references and therefore need not be described in detail.

Prior to describing the liquid crystal display apparatus according to the second embodiment of the present invention with reference to FIG. 17, data stored in the ROM 49 of this embodiment will be first described with reference to FIGS. 15 and 16.

Figure 15:
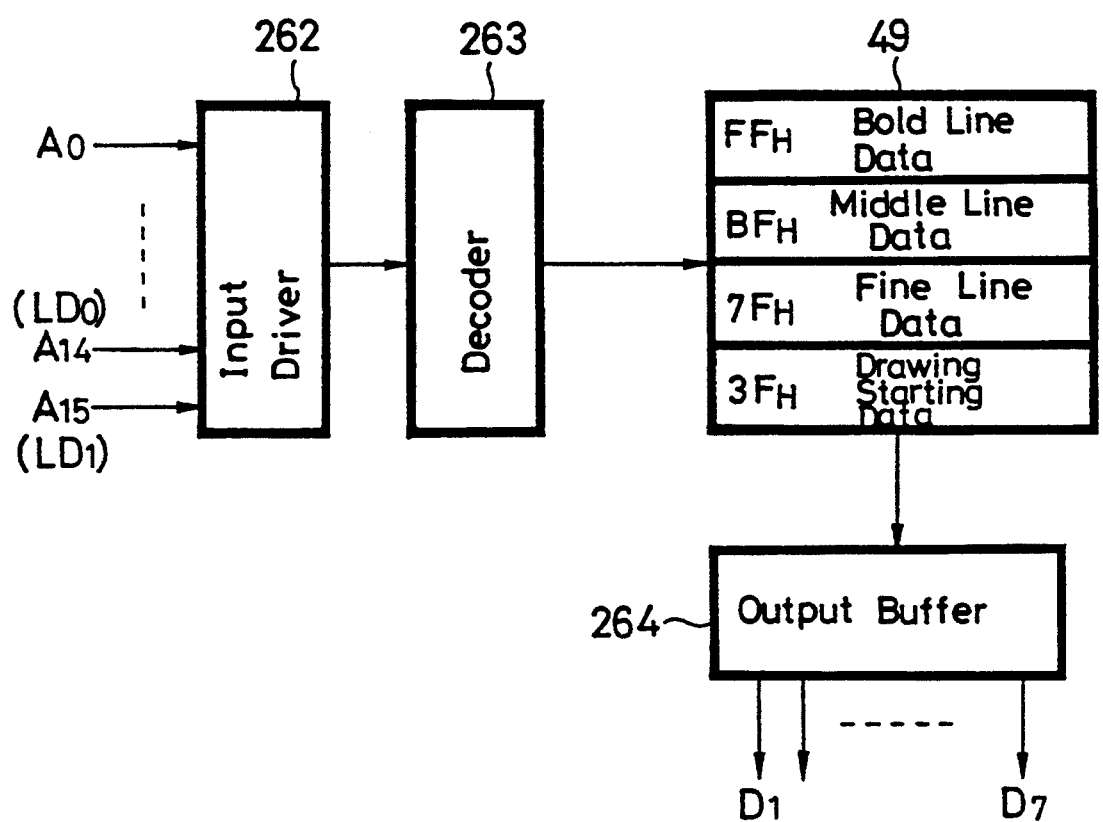
FIG. 15 is a diagram showing a memory map of a ROM (read-only memory) used in a liquid crystal display apparatus according to a second embodiment of the present invention.

Referring to FIG. 15, bold line data (address $FF_H$), middle line data (address $BF_H$), fine line data (address $7F_H$) and drawing starting data (address $3F_H$) are stored in the addresses of the ROM 49 in a divided form.

As shown in FIG. 15, data from the addresses $A_0$ to $A_5$ from the CPU 48 are supplied through an input driver 262 to a decoder 263 and the above-mentioned respective data stored in the ROM 49 are input through an output buffer 264 to a counter or the like of the PWM controller circuit 47 as data $D_1$ to $D_7$, whereby the the PWM waveform signal is output from the PWM controller circuit 47.

A relation between the drawing start data output and a drawing speed (i.e., speed which results from synthesizing $V_x + V_y$ in a vector fashion) is selected such that a straight line 265 in FIG. 16 representative of the drawing start ROM data is started from high level as compared with the straight line 154 and that the drawing start ROM data is higher in level than the drawing ROM data during a line segment except the maximum speed.

Figure 8A:
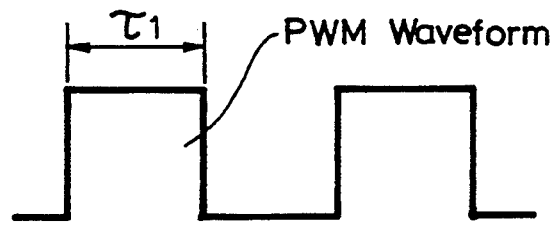
FIGS. 8A and 8B are respectively diagrams showing a relation between ROM outputs and PWM waveforms.
Figure 8B:
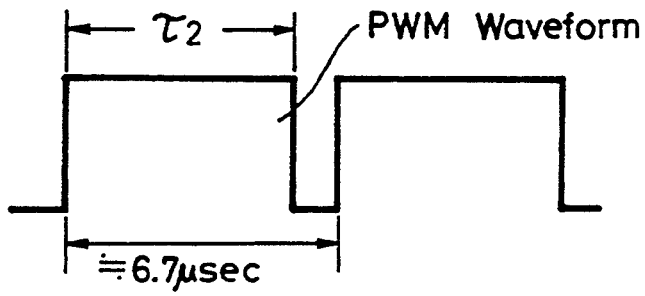
Figure 9:
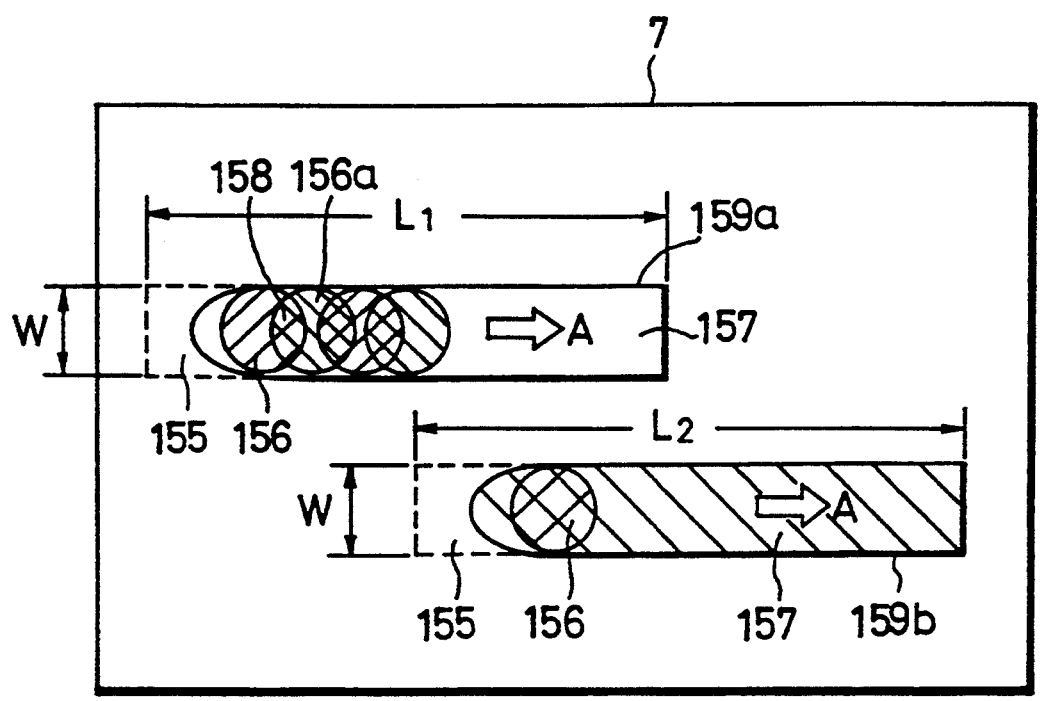
FIG. 9 is a diagram used to explain the image drawing condition of the conventional liquid crystal display device.

That is, the pulse width $\tau_2$ of the PWM waveform signal is increased in response to the drawing speed as shown in FIG. 8B.

Figure 6:
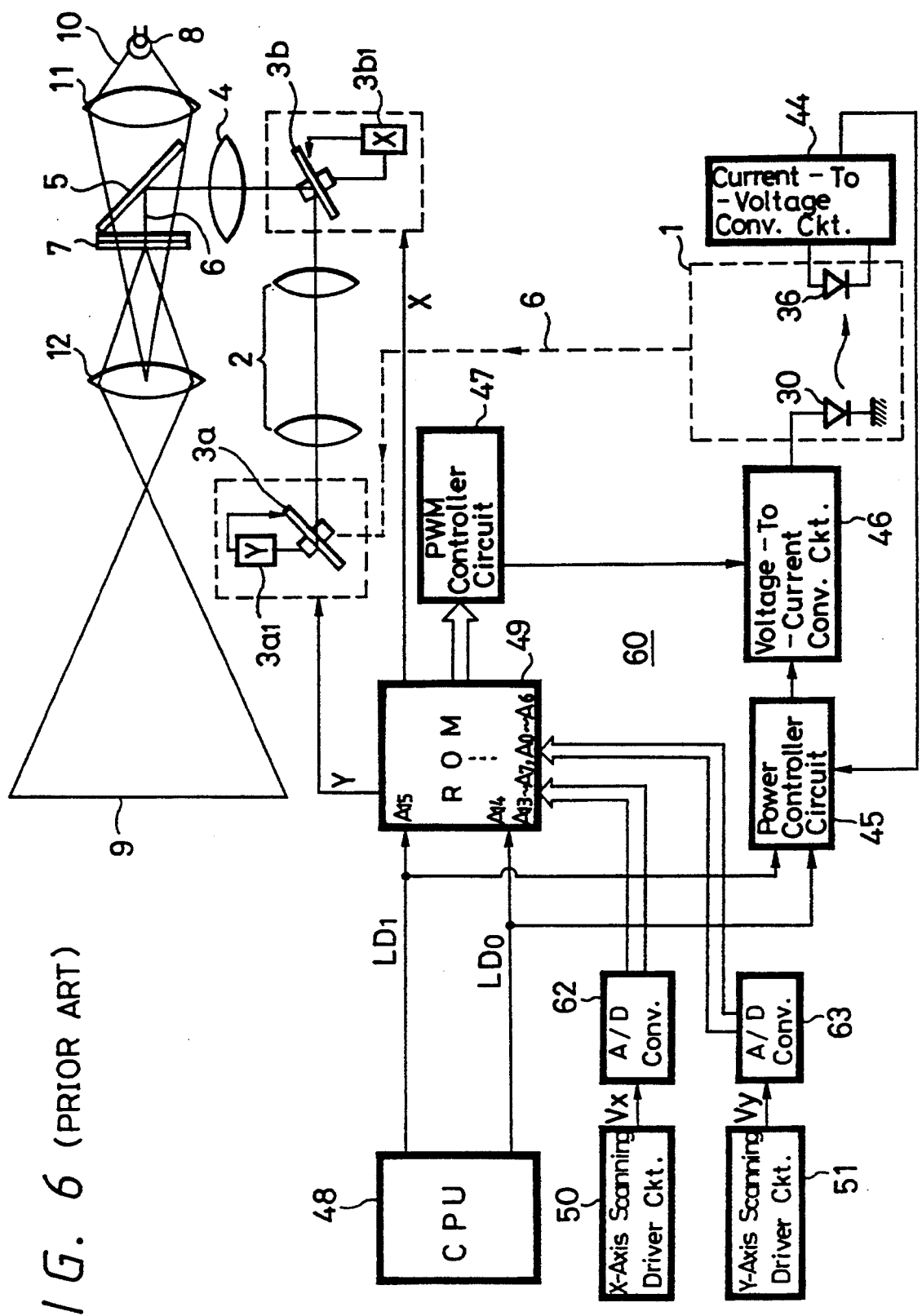
FIG. 6 is a block diagram of another example of a laser driver unit of the conventional liquid crystal display apparatus.
Figure 7:
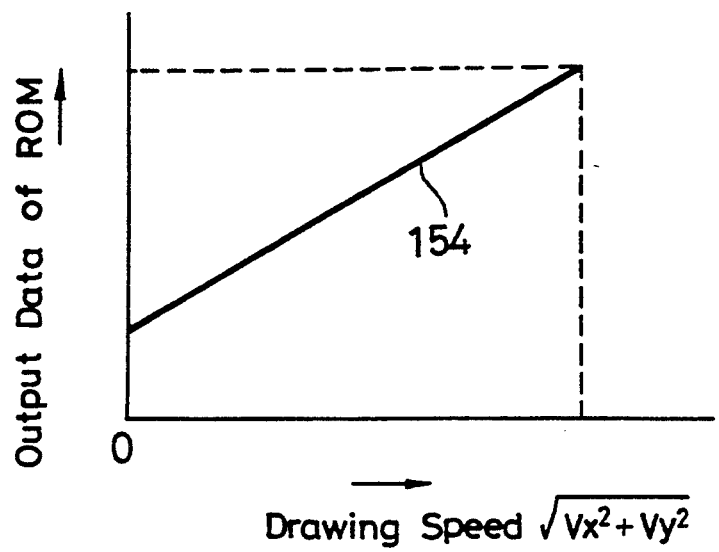
FIG. 7 is a characteristic graph graphing measured results of characteristics of an image drawing speed versus ROM output.
Figure 17:
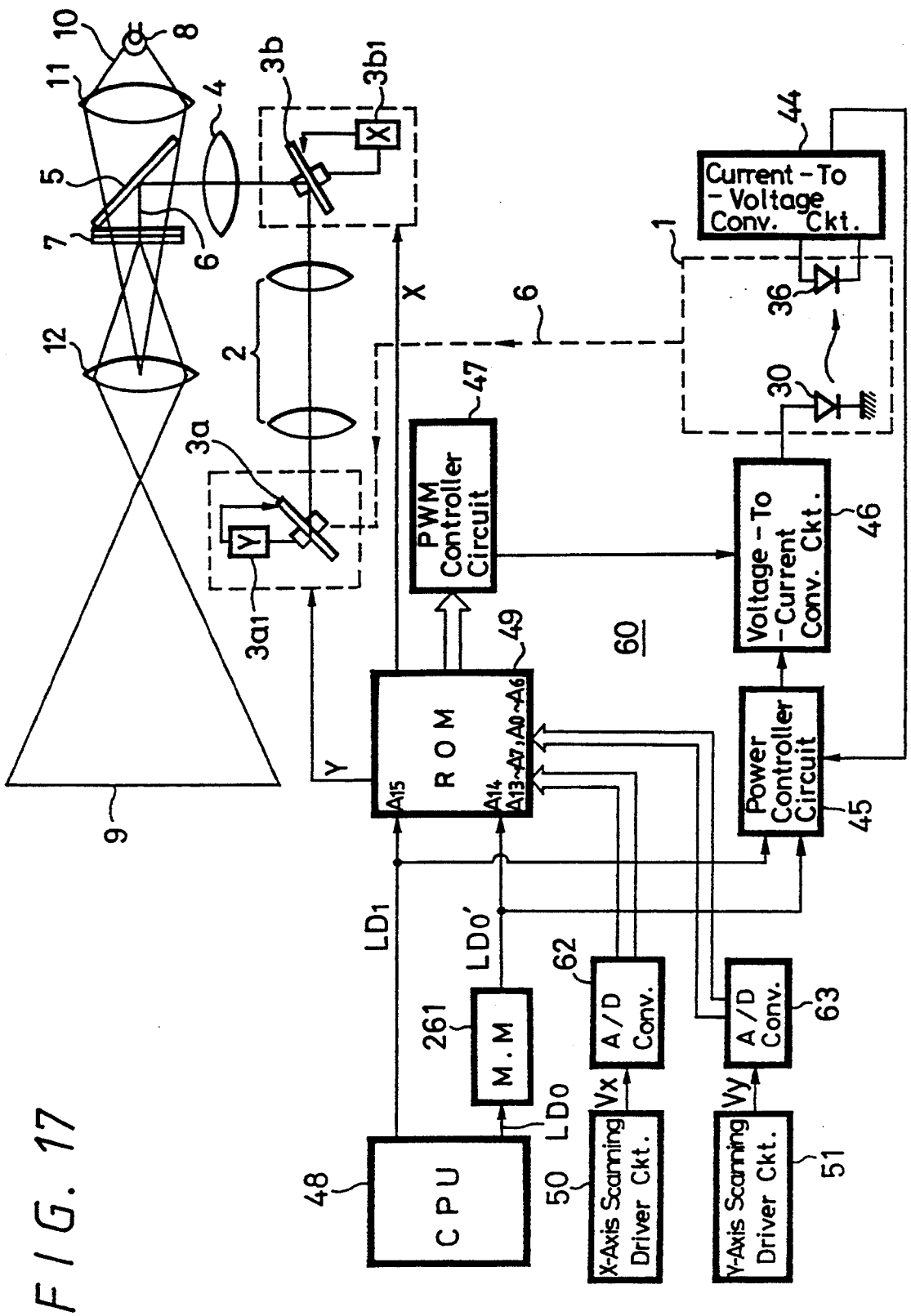
FIG. 17 is a block diagram showing a second embodiment of the laser driver unit according to the liquid crystal display apparatus according to the present invention.

FIG. 17 of the accompanying drawings shows a block diagram of the laser driver unit according to the second embodiment of the present invention which is used to switch the ROM data to the drawing start ROM output. In FIG. 17, like parts corresponding to those of FIG. 6 are marked with the same references and therefore need not be described in detail. The laser driver unit in the second embodiment shown in FIG. 17 is different from that of FIG. 6 is that the laser drive signal $LD_0$ from the CPU 48 is supplied to a one-shot or monostable multivibrator (simply referred to as M.M in FIG. 17) 261 whose output $LD_0'$ is supplied to the address terminal $A_{1\ 4}$ of the ROM 49.

That is, according to the second embodiment, the ROM data is switched to the drawing start data only during a very short period of time when the drawing is started, whereby the laser power of the laser beam emitted from the laser diode 30 is increased.

FIGS. 18A and 18B of the accompanying drawings show a waveform of the laser drive signal $LD_0$ from the CPU 48 and a waveform of the output $LD_0'$ from the monostable multivibrator 261. As shown in FIG. 18A, the CPU 48 derives the laser drive signal $LD_0$ which goes to "L" (low) level at the same time when the drawing is started and which goes to "H" (high) level at the completion of the drawing. At the same time when the drawing is started, the monostable multivibrator 261 is set to "L" (low) level during a predetermined period (e.g., 100 m sec) so that the address of the ROM 49 is switched to $3F_H$. Therefore, the data stored in this address is output from the output buffer 264 (see FIG. 15) so that the pulse width of the PWM waveform is changed from $\tau_1$ of FIG. 8A to $\tau_2$ of, for example, FIG. 8B. Thus, the laser diode 30 can generate a laser beam of large laser power at the beginning of the drawing.

Figure 19A:
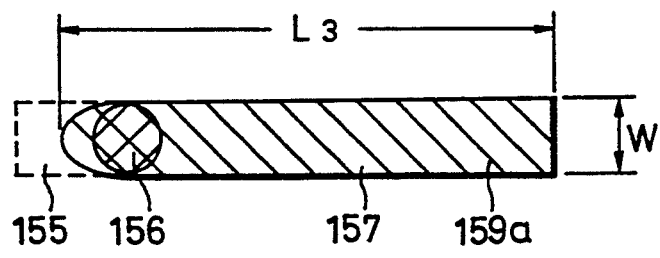
FIGS. 19A and 19B are respectively diagrams used to explain lines drawn by the liquid crystal display apparatus according to the second embodiment of the present invention.
Figure 19B:
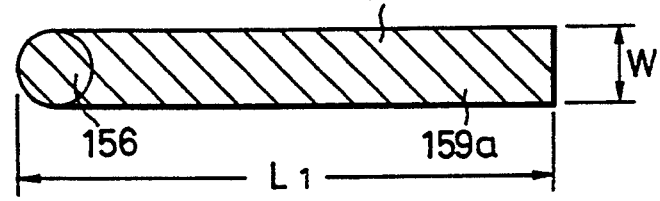

Unlike the prior art in which the non-recording portion 155 is produced and the top of the writing start portion 156 is reduced in line width in the beginning of the drawing as shown in FIG. 19A so that only a line having a length of $L_1 > L_3$ is drawn when the line having the predetermined length $L_1$ and predetermined width W is drawn, according to the liquid crystal display apparatus of the second embodiment of the present invention, although the top of the drawing start portion 156 is rounded, the line having the predetermined length and width $L_1$ and W can be drawn correctly as shown in FIG. 19B.

Furthermore, since the modulation degree of the PWM is obtained only by switching the output data in the ROM 49, the degree of modulation can be varied with great ease so that the line of uniform line width can be drawn with ease.

According to the liquid crystal display apparatus of the second embodiment of the present invention, when a predetermined graphic pattern is drawn by the irradiation of a laser beam on the liquid crystal cell, only by increasing the laser power density of the laser beam in the beginning of the drawing, the line of the predetermined dimension, i.e., uniform line width can be drawn.

Figure 1:
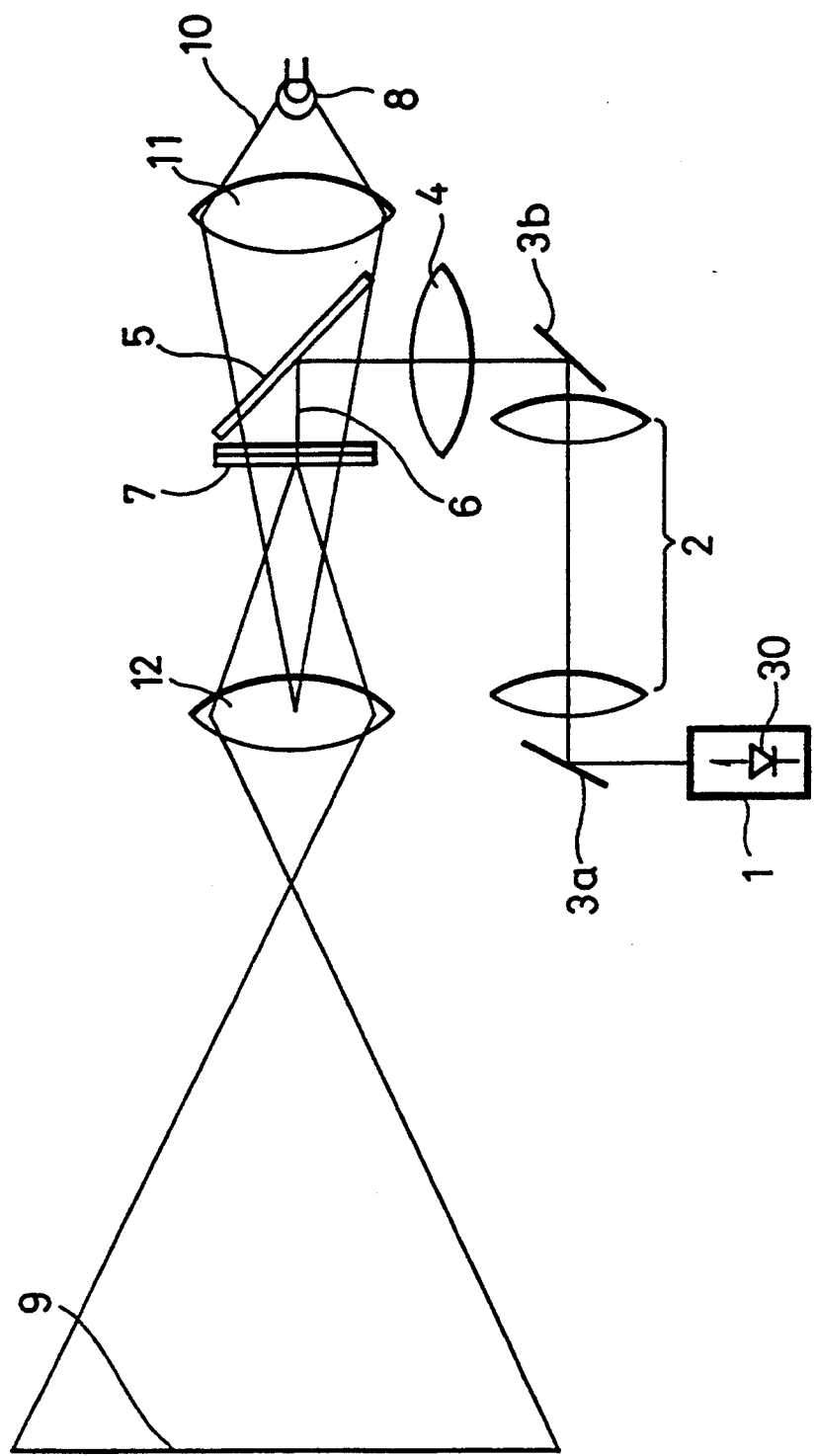
FIG. 1 is a diagram showing a structure of an optical system in a conventional liquid crystal display apparatus.
Figure 2A:
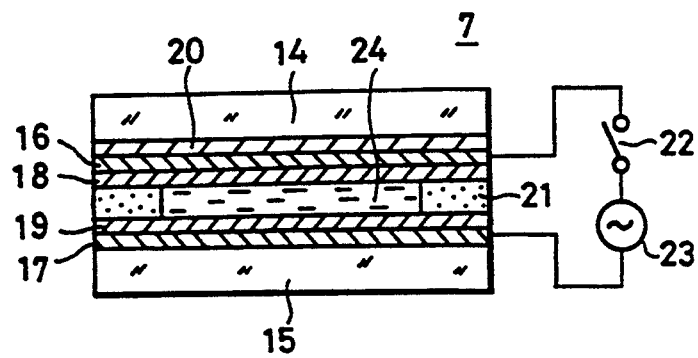
FIGS. 2A through 2D are diagrams used to explain a principle with which the conventional liquid crystal display apparatus shown in FIG. 1 is operated, respectively.
Figure 2B:
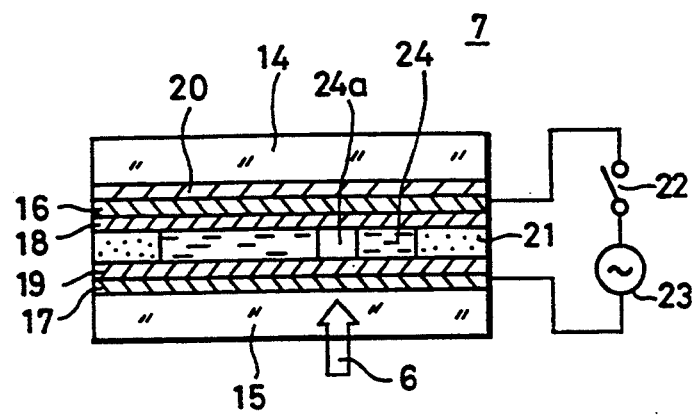
Figure 2C:
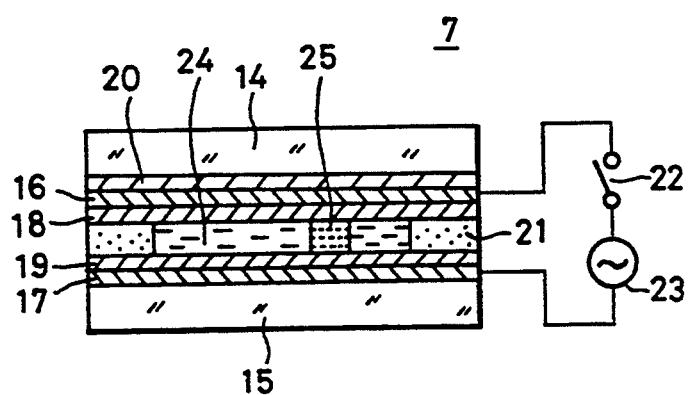
Figure 2D:
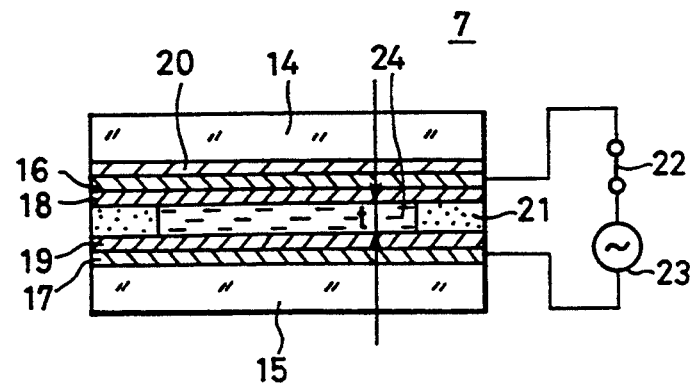
Figure 3:
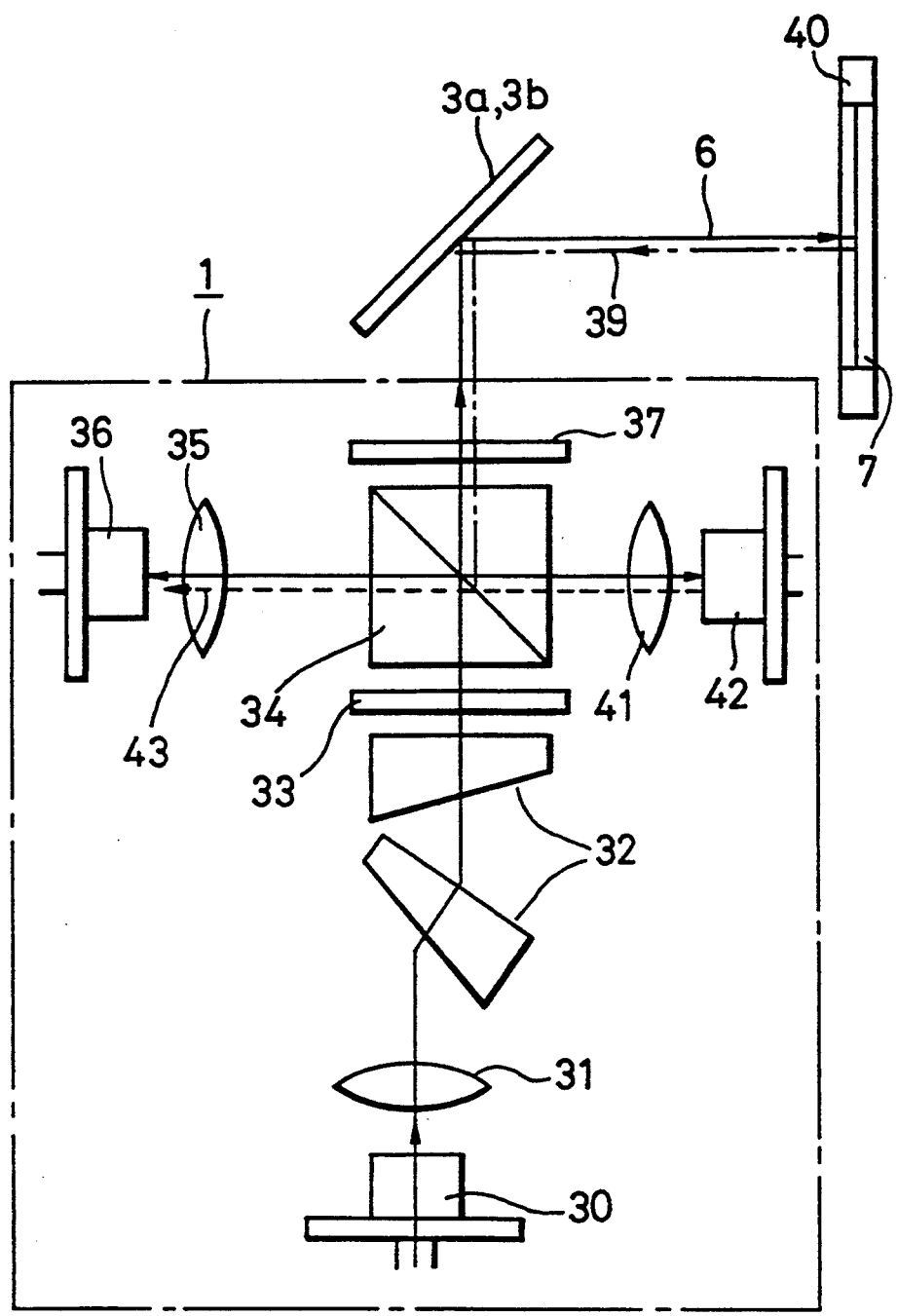
FIG. 3 is a diagram showing a structure of an optical system disposed within a laser block of the conventional liquid crystal display apparatus.
Figure 20:
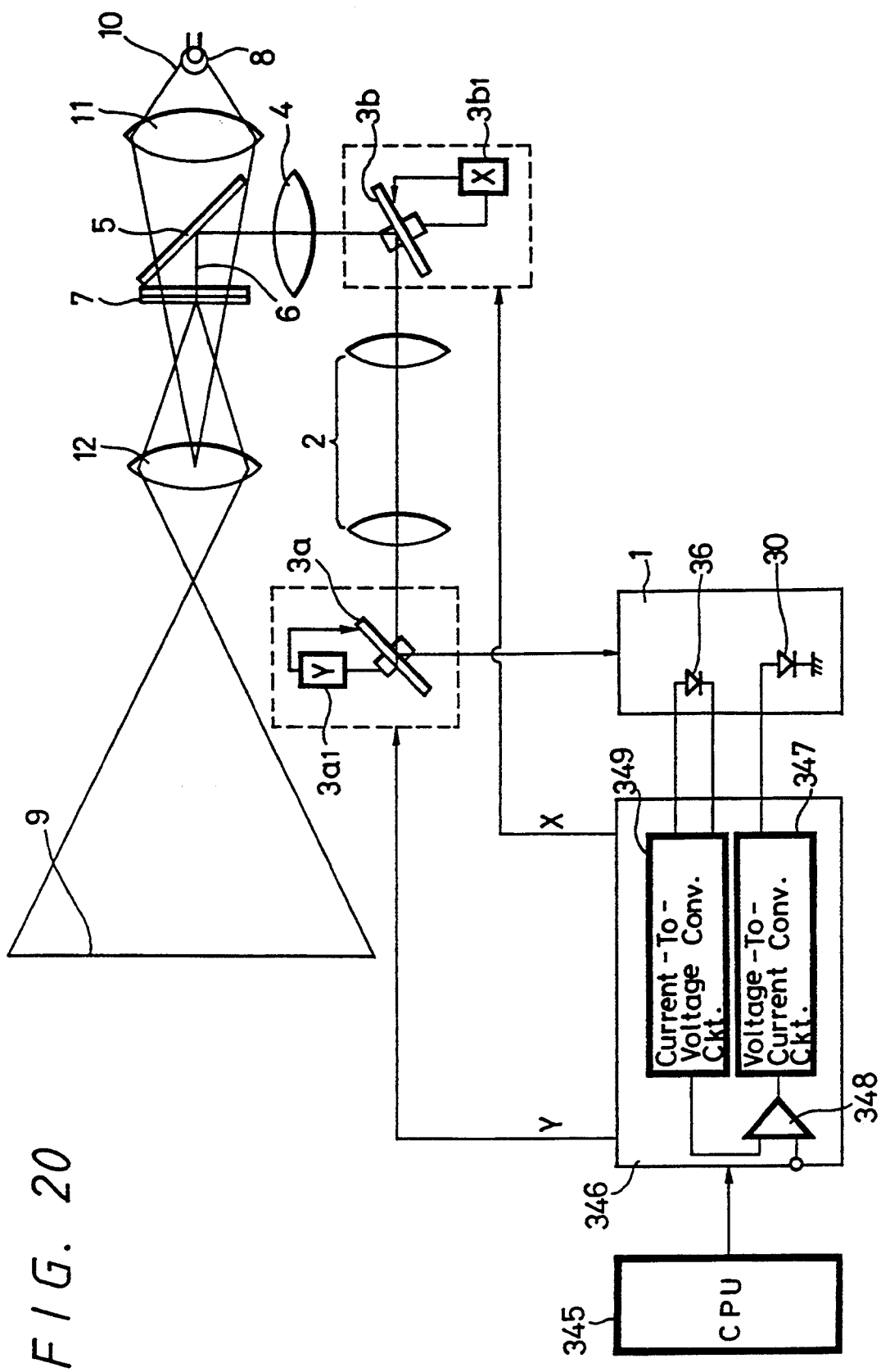
FIG. 20 is a diagram showing an entire structure of a liquid crystal display apparatus according to a third embodiment of the present invention.
Figure 21:
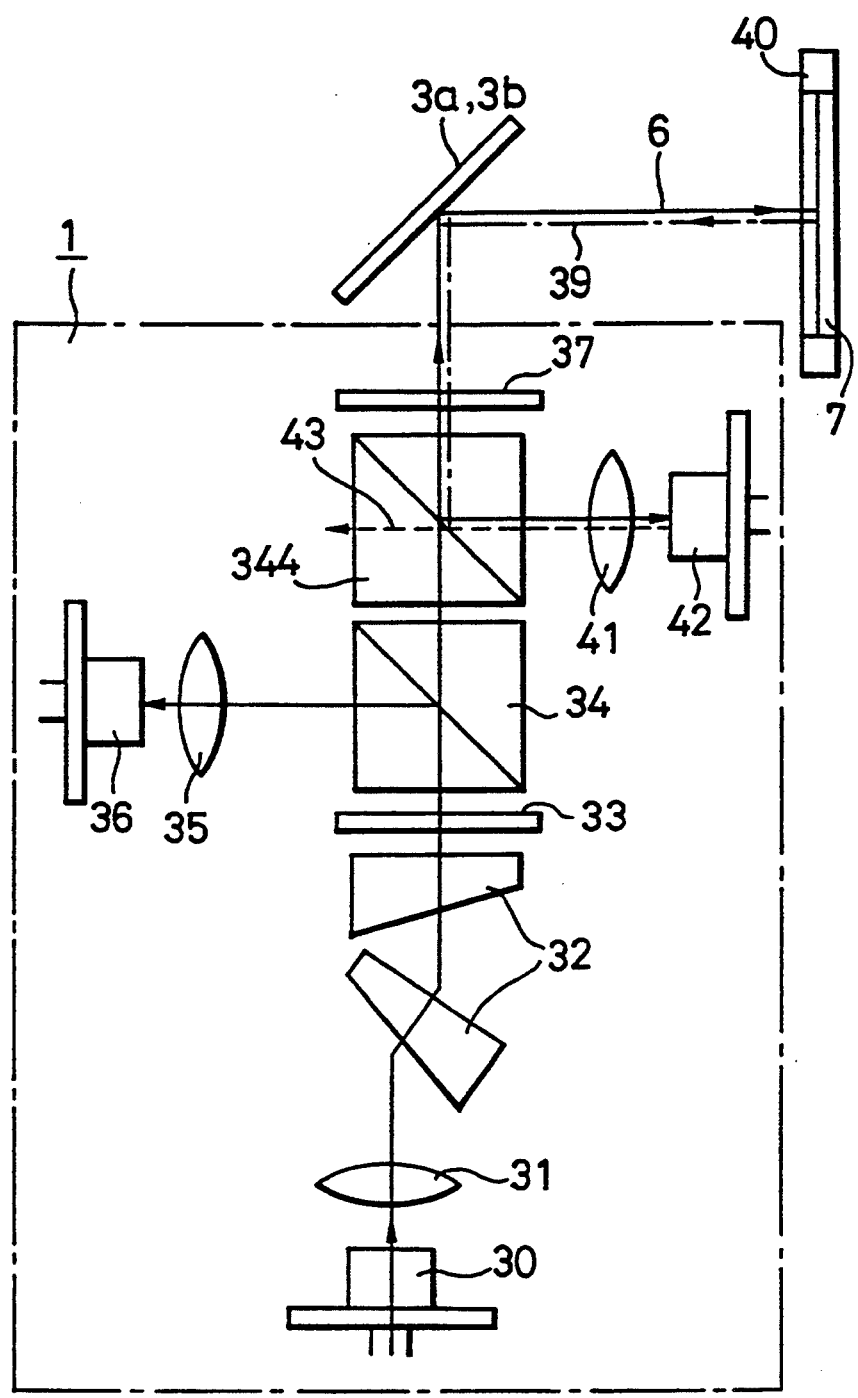
FIG. 21 is a block diagram showing a structure of an optical system provided within a laser block used in the liquid crystal display apparatus according to the third embodiment of the present invention.

The liquid crystal display apparatus according to a third embodiment of the present invention will be described below with reference to FIGS. 20 and 21. In FIGS. 20 and 21, like parts identical to those of FIGS. 1 and 3 are marked with the same references and therefore need not be described in detail.

Prior to describing the structure of the laser block 1 according to the third embodiment of the present invention with reference to FIG. 21, the liquid crystal display apparatus according to the third embodiment of the present invention will be described below with reference to FIG. 20.

FIG. 20 of the accompanying drawings shows the whole structure of the liquid crystal display apparatus according to the third embodiment of the present invention.

As shown in FIG. 20, a host computer 345 is a CPU (central processing unit) and operates to control a signal generator circuit 346, from which there are generated various signals.

The signal generator circuit 346 generates the Y-axis and X-axis scanning signals X and Y to the galvanoscanner mirrors 3a, 3b to control the writing laser beam 6, thereby drawing a graphic pattern of a predetermined locus or the like on the liquid crystal cell 7.

Further, the laser diode 30 disposed within the laser block 1 is controlled in a PWM fashion by means of a voltage-to-current converter circuit 347 so that the laser power thereof is controlled. The voltage-to-current converter circuit 347 is supplied with a comparing voltage from a comparator circuit 348. The comparator circuit 348 is supplied at its one input terminal with a monitor current from the monitor photodiode 36 through a current-to-voltage converter circuit 49 and is also supplied at another input terminal with a reference voltage. Then, the comparator circuit 348 compares the monitor current with the reference voltage to thereby control the laser diode 36 base on the compared output in an APC fashion. Thus, the power source voltage of the laser diode 30 is stabilized. Of course, the output or the like from the detection photodiode 42 disposed within the laser block 1 is also supplied to the signal generator circuit 346 and the CPU 345, though not shown. A rest of the structure of this optical system is similar to that of the above embodiment.

FIG. 21 of the accompanying drawings shows the optical system disposed within the laser block 1 according to the third embodiment of the present invention.

The polarizing beam splitter 34 which is used in this embodiment and which is the same as that shown in FIG. 3 is arranged such that it separates a part of the writing laser beam 6 emitted from the laser diode 30 and passes the rest of the writing laser beam 6 therethrough, while it does not separate a detection reflected-back beam. Therefore, as shogun in FIG. 21, a second polarizing beam splitter 344 is disposed distant from the first polarizing beam splitter 34 on the optical path by a predetermined spacing.

The second polarizing beam splitter 344 passes the writing laser beam 6 passed through the first polarizing beam splitter 34 and reflects the reflected-back beam 39 reflected on the liquid crystal cell 7.

Accordingly, the monitor collimator lens 35 and the monitor photodiode 36 are disposed on an optical path of the reflected light of the writing laser beam 6 in an opposing relation to the first polarizing beam splitter 34.

Similarly, the collimator lens 41 and the position detection photodiode 42 are disposed on the optical path of the reflected light of the writing laser beam 6 in an opposing relation to the second polarizing beam splitter 344. A rest of the structure of this optical system is substantially the same as that in FIG. 3.

Operation of the liquid crystal display device according to the third embodiment of the present invention will be described.

As shown in FIG. 21, the writing laser beam 6 of the linear polarized P-component emitted from the laser diode 30 is collimated by the collimator lens 31 and corrected in shape by the anamorphic prism 32 from ellipse to circle.

Then, the linear polarized P-component is rotated 90 degrees by the half-wave plate 33 and a part thereof (less that several % is converted into the linear polarized S-component which is then introduced into the first polarizing beam splitter 34. The linear polarized P-component is passed through the first polarizing beam splitter 34, whereas a part of the S-component is reflected on the first polarizing beam splitter 34 and then introduced through the collimator lens 35 into the monitor photodiode 36. The laser beam introduced into the photodiode 36 is converted into an electrical signal. As shown in FIG. 20, this electrical signal is fed through the current-to-voltage converter circuit 349, the comparator circuit 348 and the voltage-to-current converter circuit 347 back to the laser diode 30 to effect the APC so that the output of the laser diode 30 is made constant.

The laser beam 6 of the linear polarized P-component passed through the first polarizing beam splitter 34 is passed through the second polarizing beam splitter 344 as it is and introduced into the quarter-wave plate 37. The linear polarized P-component is rotated 45 degrees by the quarter-wave plate 37 and converted into a circular polarized component. This circular polarized component scans the liquid crystal cell 7 via the galvanoscanner mirrors 3a, 3b to thereby draw a predetermined graphic pattern. An instruction of this drawing of the graphic pattern is issued from the input operation unit side of the CPU 345 shown in FIG. 20.

Although the graphic pattern thus drawn is projected on to the screen 9, the laser beam whose power does not contribute the drawing is returned through the same optical path into the laser block 1 as the reflected-back beam 39. At that time, since the reflected-back beam 39, which is passed through the quarter-wave plate 37 again, it is rotated 45 degrees, i.e., rotated 90 degrees in total by the quarter-wave plate 37. Thus, the circular polarized component is converted into the linear polarized S-component. Then, the S-component is reflected on the second polarizing beam splitter 344 and introduced through the position detection collimator lens 41 into the position detection photodiode 42, in which it is converted into the position detection signal.

The reflected-back beam 39 is not wholly absorbed on the surface of the photodiode 42 and then it is partly diffused thereon. In this case, since the monitor photodiode 36 that monitors the output of the laser diode 30 to effect the APC on the laser diode 30 is not disposed on the optical path of the scattering laser beam 43, the monitoring by the monitor photodiode 36 is not affected by the scattering beam 43.

Unlike the prior art in which the reflected-back beam 39 of the writing laser beam 6 drawn on the liquid crystal surface of the liquid crystal cell 7 is not always constant and fluctuated in level, according to the liquid crystal display apparatus of the third embodiment of the present invention, the reflected-back beam 39 whose level is fluctuated can be avoid from being introduced into the photodiode 36, thereby removing the factor with which the level of the reflected-back beam 39 is fluctuated when the laser power of the laser diode 30 is controlled. Therefore, the laser power of the laser diode 30 can be stabilized when the liquid crystal display apparatus is driven.

While the two polarizing beam splitters 34 and 344 are used as described above, the first polarizing beam splitter 34 may be formed of an ordinary beam splitter or may be replaced with a dichroic mirror or the like.

According to the third embodiment of the liquid crystal display apparatus of the present invention, when the laser output from the laser diode is controlled in response to the drawing speed, the scattering beam whose output level is fluctuated is prevented from being introduced into the photodiode that operates to monitor the output of the laser diode, thereby operating the APC circuit stably. Therefore, the output of the laser diode can be kept constant so that the line width of the line to be drawn can be kept uniform.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A liquid crystal display apparatus, comprising:
   (a) a laser beam source for emitting a laser beam;
   (b) a liquid crystal cell for providing an image by means of the effect of the laser beam heating and which contains a liquid crystal layer positioned between a pair of substrates;
   (c) scanning means for scanning the laser beam to said liquid crystal layer to thereby produce a line drawing; and
   (d) modulation means for modulating a line width of the line drawing so as to keep a uniform line width, said modulation means comprising
      means for controlling a laser power level of a laser beam emitted from said laser beam source, said laser power level controlling means comprising first and second beam splitters, said first beam splitter detecting a laser power and said second beam splitter detecting a light returned from the liquid crystal layer.

2. The liquid crystal display apparatus according to claim 1, further comprising projection means for projecting the image generated on said liquid crystal cell.

3. The liquid crystal display apparatus according to claim 2, further comprising a screen for displaying a projected image projected with said projection means.

4. The liquid crystal display apparatus as claimed in claim 1, wherein said first and second beam splitters comprise polarizing beam splitters, respectively.

* * * * *